(12) United States Patent
Florio

(10) Patent No.: US 11,540,502 B2
(45) Date of Patent: Jan. 3, 2023

(54) DIAGNOSTIC INTERACTIVE APPLIED SHOE FOR HORSES

(71) Applicant: Jude R. Florio, Morganville, NJ (US)

(72) Inventor: Jude R. Florio, Morganville, NJ (US)

( * ) Notice: Subject to any disclaimer, the term of this patent is extended or adjusted under 35 U.S.C. 154(b) by 0 days.

(21) Appl. No.: 16/879,369

(22) Filed: May 20, 2020

(65) Prior Publication Data

US 2020/0367482 A1 Nov. 26, 2020

Related U.S. Application Data

(60) Provisional application No. 62/850,281, filed on May 20, 2019.

(51) Int. Cl.
*A01L 3/04* (2006.01)
*A01L 7/02* (2006.01)

(52) U.S. Cl.
CPC .. *A01L 3/04* (2013.01); *A01L 7/02* (2013.01)

(58) Field of Classification Search
CPC ..... A01L 1/04; A01L 3/04; A01L 5/00; A01L 7/02
See application file for complete search history.

(56) References Cited

U.S. PATENT DOCUMENTS

| 346,350 | A | * | 7/1886 | Bingham | A01L 5/00 |
| 1,262,627 | A | * | 5/1917 | Borcherts | A01L 3/04 |
| 4,580,637 | A | * | 4/1986 | King | A01L 1/04 168/7 |
| 2016/0249597 | A1 | * | 9/2016 | Ruetenik | A01L 7/02 |
| 2017/0127661 | A1 | * | 5/2017 | Sledd | A01L 1/04 |

* cited by examiner

*Primary Examiner* — Joshua J Michener
*Assistant Examiner* — Henry Hooper Mudd
(74) *Attorney, Agent, or Firm* — Fox Rothschild LLP

(57) ABSTRACT

A diagnostic horseshoe combining a toe portion selected from a group of at least two toe portions, the selected toe portion including two toe joint ends; a lateral heel portion selected from a group of at least two lateral heel portions, the selected lateral heel portion including a point end and a heel joint end; and a medial heel portion selected from a group of at least two medial heel portions, the selected medial heel portion including a point end and a heel joint end, wherein an interlocking joint connects the heel joint end of the selected lateral heel portion to one of the two toe joint ends of the selected toe portion, and another interlocking joint connects the heel joint end of the selected medial heel portion to the other of the two toe joint ends of the selected toe portion.

12 Claims, 9 Drawing Sheets

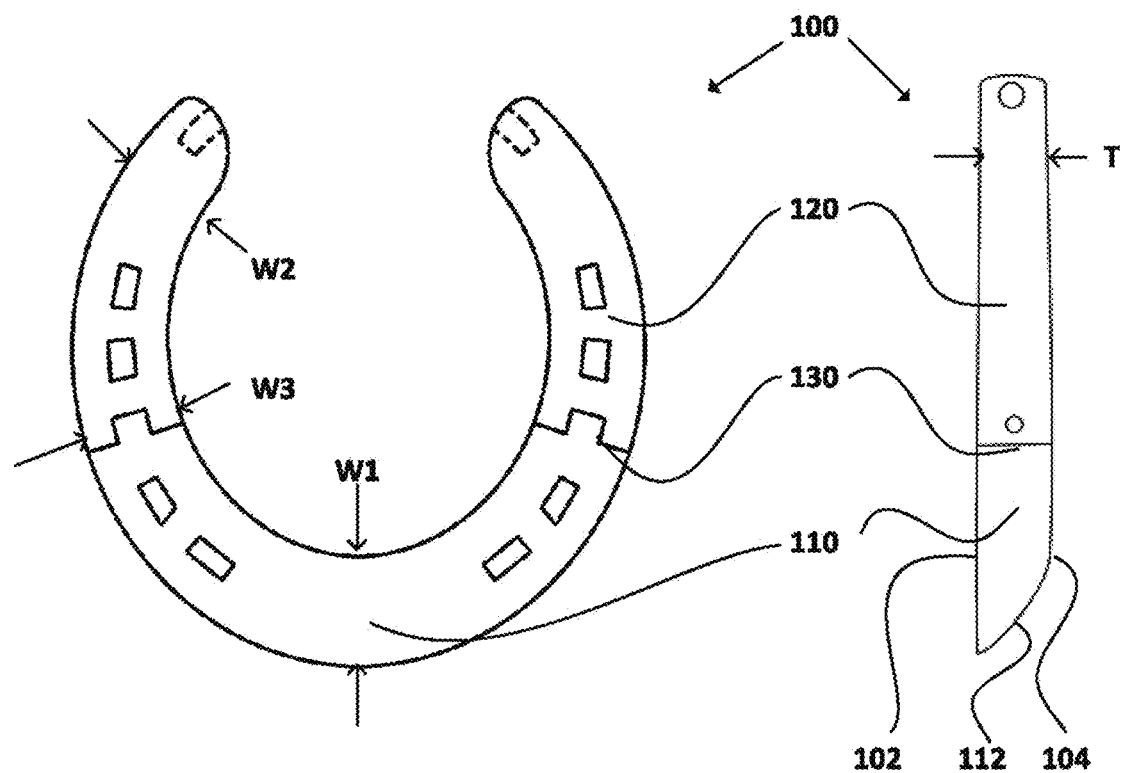
FIG. 1
FIG. 2
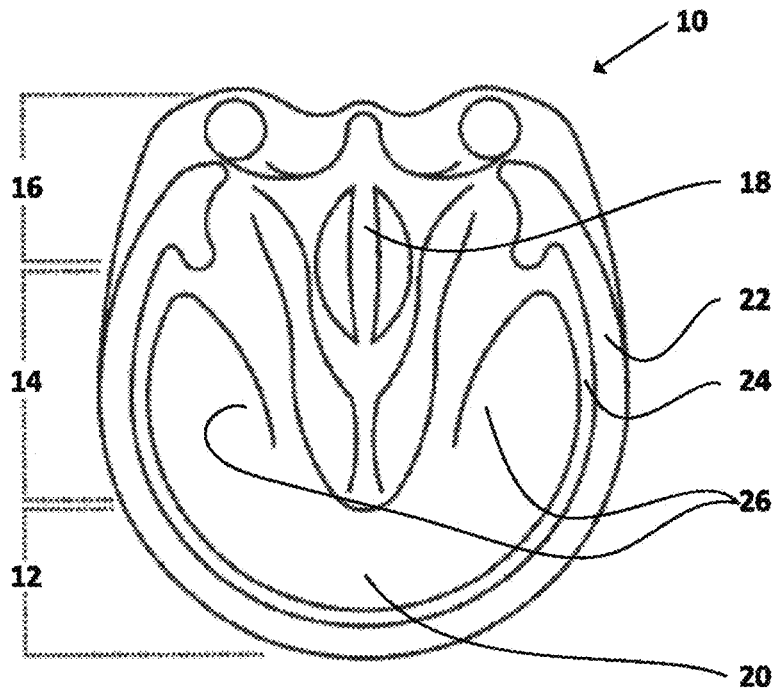
Prior Art
FIG. 3

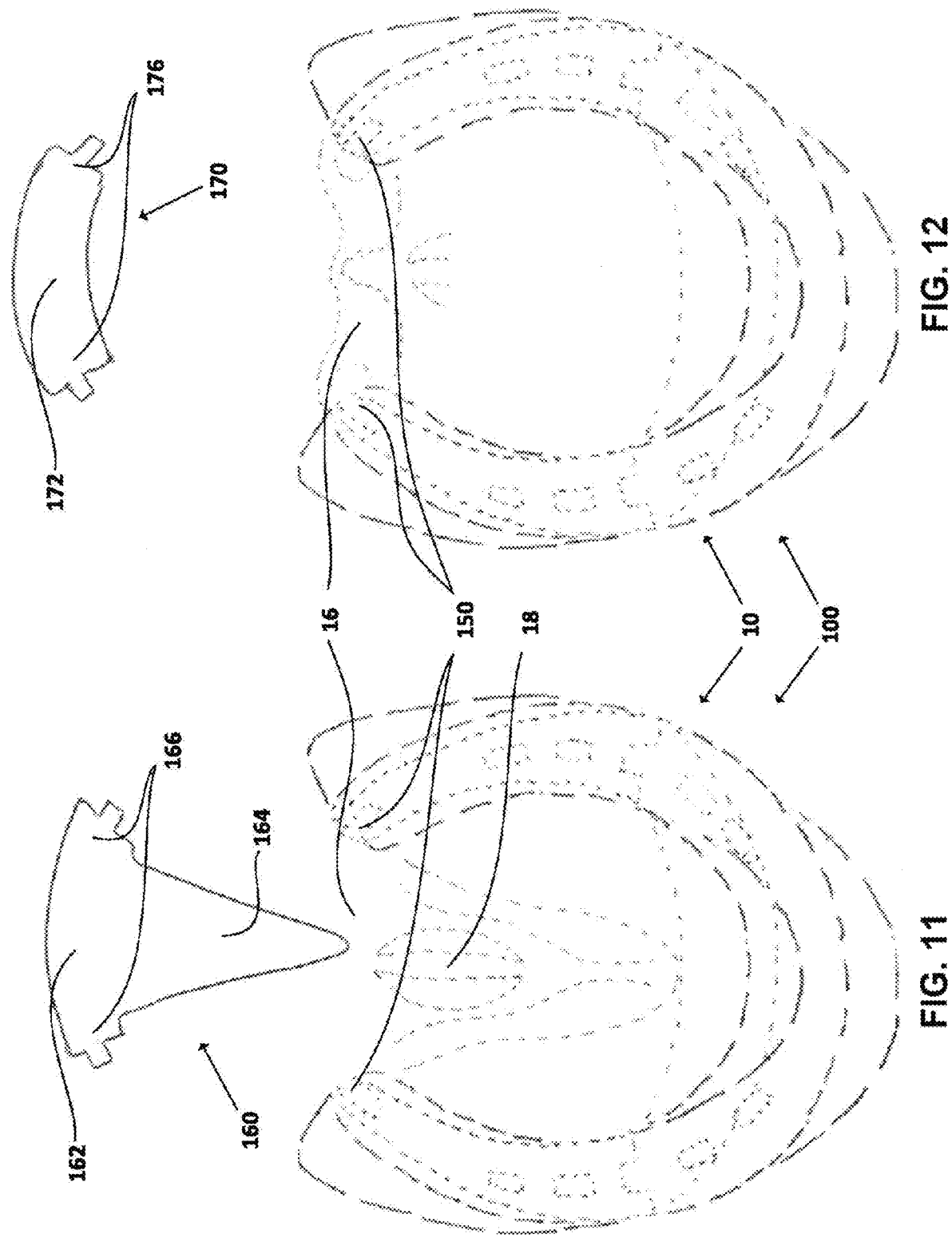

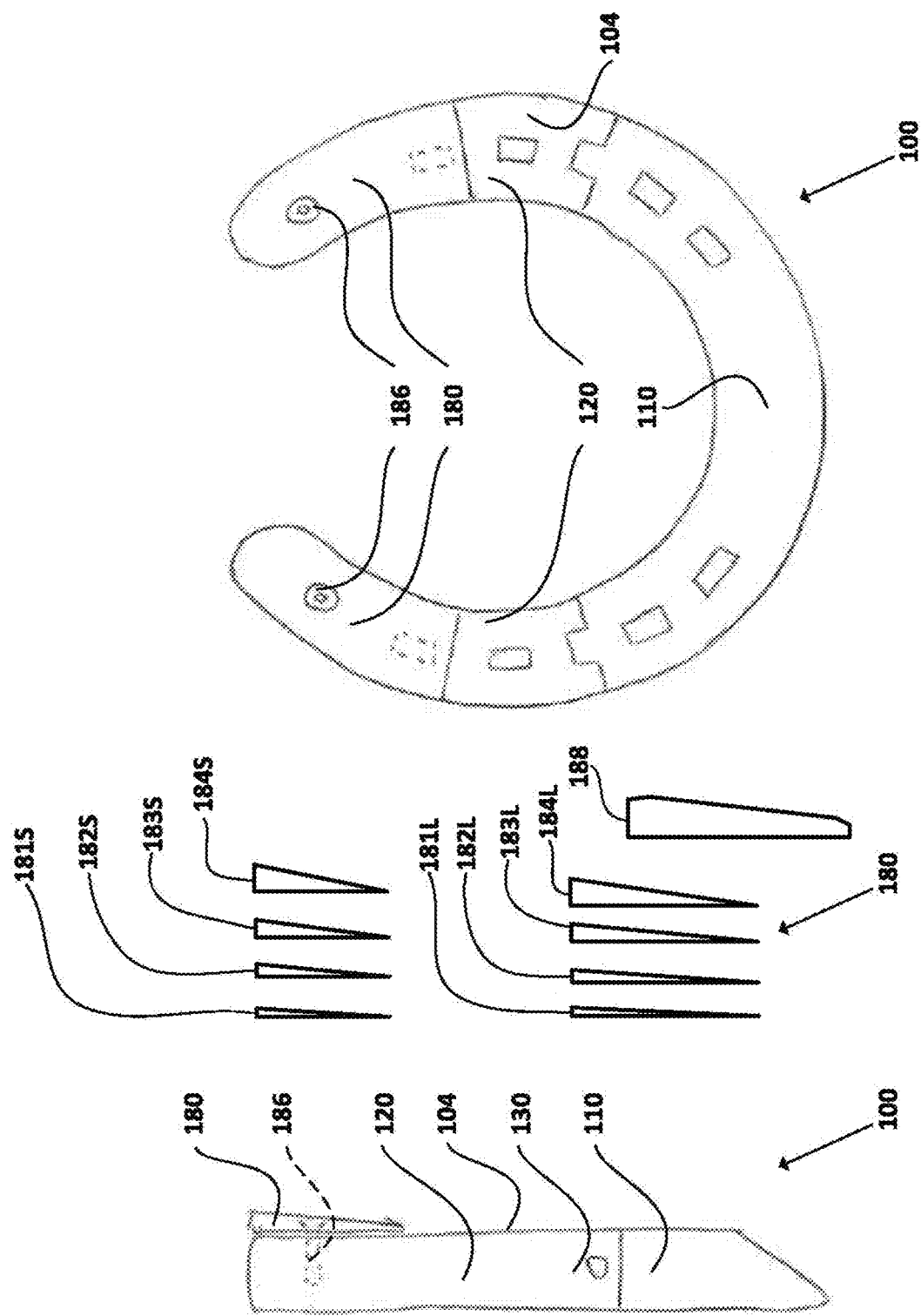

DIAGNOSTIC INTERACTIVE APPLIED SHOE FOR HORSES

CROSS REFERENCE TO RELATED APPLICATIONS

This application claims priority to U.S. Provisional Patent Application No. 62/850,281, filed May 20, 2019, the content of which is incorporated by reference in its entirety.

BACKGROUND

Statement Of The Technical Field

The present disclosure relates generally to shoes for equid animals and, in particular, to horseshoes.

Description of the Related Art

Equid (e.g., equine) animals are any of a family (Equidae) of perissodactyl mammals consisting of the horses, asses, zebras, and extinct related animals. Many domesticated equid, such as, for example, horses, are used for transportation and hauling cargo, sometimes over rough paths. Irrespective of whether a domestic horse is shod (i.e., having horseshoes) or unshod (i.e., barefoot), these equid animals are all in need adequate and regular hoof care. This is especially true for domestic horses, since they are unable to wear their hooves down as nature intended.

Horses require horseshoes to be applied for many reasons which include the following: relief of hoof soreness, need for traction/protection, job specific shoeing, pathology, and orthopedic applications. In the application of horseshoes, the question remains that, when a shoe is placed and applied to the hoof, does where the shoe is placed have a positive effect on the unrollment of the hoof, commonly known as breakover? The breakover/unrollment is the process that occurs during the last important moment within the stance phase when the heels leave the ground and the entire hoof rotates around the toe. The breakover/unrollment of the hoof is traditionally believed to be influenced by shoeing.

The shoeing of horses is primarily to alleviate pain and discomfort to a barefoot hoof (hooves) enabling a horse to perform its task soundly without lameness. Veterinarians, equine podiatrists, and farriers (the user) often speculate as to the best course of action when applying horseshoes to the fore and hind hoof.

Horseshoes come in varying materials such as, for example, steel, aluminum, titanium, and/or various polymers and plastics. Horseshoes are routinely applied with horseshoe-specific nails or, in some special instances, special glue(s). In all instances of horseshoe application, there are differences of opinion as to where a horseshoe must be placed in order to achieve optimal unrollment or the ease at which a horse can work without any unnecessary or undue stress being placed upon the hoof or related soft tissue elements of the hoof and leg.

There are instances where subject horses are afflicted with biomechanical issues and pathology with the distal phalanx, navicular, and other structures of the foot and related soft tissues which requires the application of prescribed orthopedic shoes to alleviate the aforementioned. Oftentimes, the attending veterinarian, equine podiatrist, and/or farrier are required to apply special horseshoes with negative results, which fail to alleviate the soreness, pain and discomfort.

SUMMARY

The purpose of this disclosure is to propose an equid shoe that, above all respects, is constructed prior to shoeing and after performing local diagnostic measurements, followed by an interactive application of the shoe. The proposed horseshoe is a diagnostic interactive applied shoe (ΔΙΑΣ/ διας or D.I.A.S.) for horses. The D.I.A.S. title pays homage to the first known written example of a horseshoe found in certain Greek documents dating from circa 500 B.C., which place emphasis on the need to harden the hoof and mentions embatai, a kind of leather sandal laced to the feet of some horses.

The D.I.A.S. for horses will enable an attending veterinarian, equine podiatrist, or farrier to affix a horseshoe to a subject horse's hooves to determine the best course of action when shoeing the subject horse to achieve symmetry of gait, soundness, and ability to perform without pain, discomfort, and unnecessary horseshoe applications. This may be performed in a single visit, thus reducing the number of return visits for adjustments to correct the gait.

Therefore, according to one aspect of the disclosure, a diagnostic horseshoe is provided combining a toe portion selected from a group of at least two toe portions, the selected toe portion including two toe joint ends; a lateral heel portion selected from a group of at least two lateral heel portions, the selected lateral heel portion including a point end and a heel joint end; and a medial heel portion selected from a group of at least two medial heel portions, the selected medial heel portion including a point end and a heel joint end, wherein an interlocking joint connects the heel joint end of the selected lateral heel portion to one of the two toe joint ends of the selected toe portion, and another interlocking joint connects the heel joint end of the selected medial heel portion to the other of the two toe joint ends of the selected toe portion.

The D.I.A.S. for horses allows the user to apply a horseshoe to a subject horse with multiple options. The user (veterinarian, equine podiatrist, farrier) can affix the D.I.A.S. for horses with the ability to adjust the toe lengths to determine where the toe piece placement is in proximity to the frog of the subject hoof effects the optimal unrollment. Optimal unrollment defined as ease of motion of the hoof and limb, with no pain or discomfort. Furthermore, the D.I.A.S. for horses will give the user the option to apply additional pieces to the shoe when an attending veterinarian determines pathology requiring an orthopedic horseshoe application. These pieces are the eggbar, heartbar, collateral quarter, and degreed heel wedges. Each piece when applied can demonstrate to an attending veterinarian which one of combinations of pieces alleviates pain, lameness, and unsoundness.

BRIEF DESCRIPTION OF THE DRAWINGS

FIG. 1 illustrates a bottom view of a novel D.I.A.S. for horses.

FIG. 2 illustrates a side view of the D.I.A.S. for horses of FIG. 1.

FIG. 3 illustrates a bottom view of a prior art equid hoof.

FIG. 11 illustrates a bottom view of an example heartbar portion.

FIG. 12 illustrates a bottom view of an example eggbar portion.

FIG. 13 illustrates a side view of a D.I.A.S. for horses including heel wedges.

FIG. 14 illustrates side views of various embodiments of the heel wedges.

FIG. 15 illustrates a bottom view of the D.I.A.S. for horses including the heel wedges of FIG. 12.

DETAILED DESCRIPTION

Figure 4:
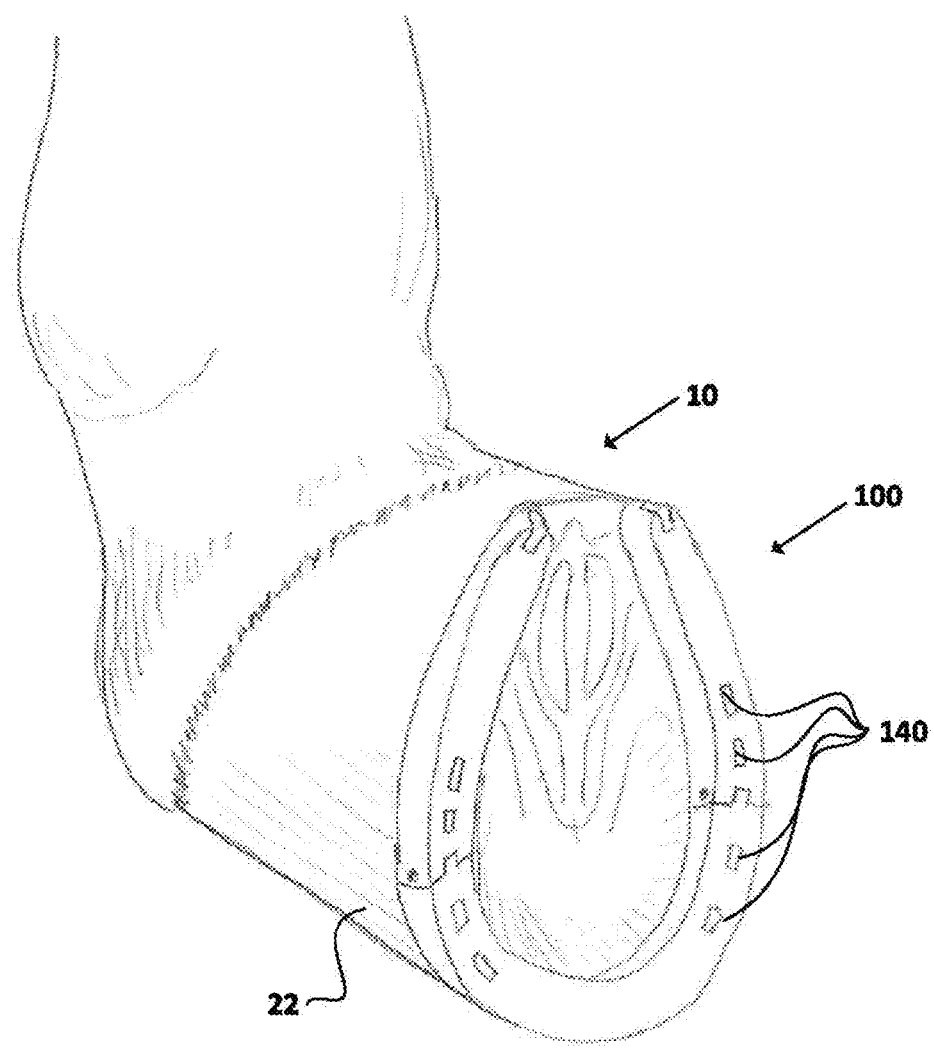
FIG. 4 illustrates an example D.I.A.S. for horses shod on a horse.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

FIG. 1 illustrates a bottom view of a novel D.I.A.S. 100, while FIG. 2 illustrates a side view of the D.I.A.S. 100. The D.I.A.S. 100 for horses may include a toe portion 110 and two heel portions 120. Each heel portion 120 may be connected to the toe portion 110 by an interlocking joint 130 as will be described in more detail below. The upper surface 102 of the D.I.A.S. 100 is fixed (i.e., shod) to a hoof while the bottom surface 104 is designed to resist the wear and tear of striking the ground. The toe portion 110 of the bottom surface 104 includes a roller toe 112, which allows for ease of unrollment during dynamic movement of the hoof 10.

The D.I.A.S. 100 has a toe width W1, a heel width W2, a joint width W3, and a thickness T. The toe width W1 is measured at the center of the toe portion 110 and may be in the range of approximately 1 to 2 inches. The heel width W2 is measured at approximately the rear of the heel portion 120 and may also be in the range of approximately 0.5 to 2 inches. The joint width W3 is measured at the center of the interlocking joint 130 and is approximately 1 inch. The thickness T is measured from the upper surface 102 to the bottom surface 104 and may be in the range of approximately 0.15 to 0.65 inch.

FIG. 3 illustrates a bottom view of a typical equid hoof 10, for example that of a subject horse. The hind foot is similar. However, the toe of the hind foot is more pointed than that of the forefoot. The hoof 10 is generally divided into five areas: a toe 12, quarters 14, heels 16, frog 18 and sole 20. The outermost portion of the hoof 10 is the wall 22. The wall 22 is normally thickest at the toe 12 and gradually thins towards the heels 16. The inside of the wall 22 is slightly straighter than the outside. Between the wall 22 and the sole 20 is the white line 24. At the heels 16, the wall 22 turns anteriorly to form the bars 26 that converge toward one another. The frog 18 is a wedge-shaped mass that occupies the angles bounded by the bars 26 and the sole 20. The frog 18 is the foot pad of the subject horse and is the most elastic structure of the hoof 10. The wall 22, bars 26 and frog 18 are the weight-bearing structures of the hoof 10. The sole 20 should not bear weight except for a strip about ¼ inch wide, or less, inside of the white line 24.

Figure 5:
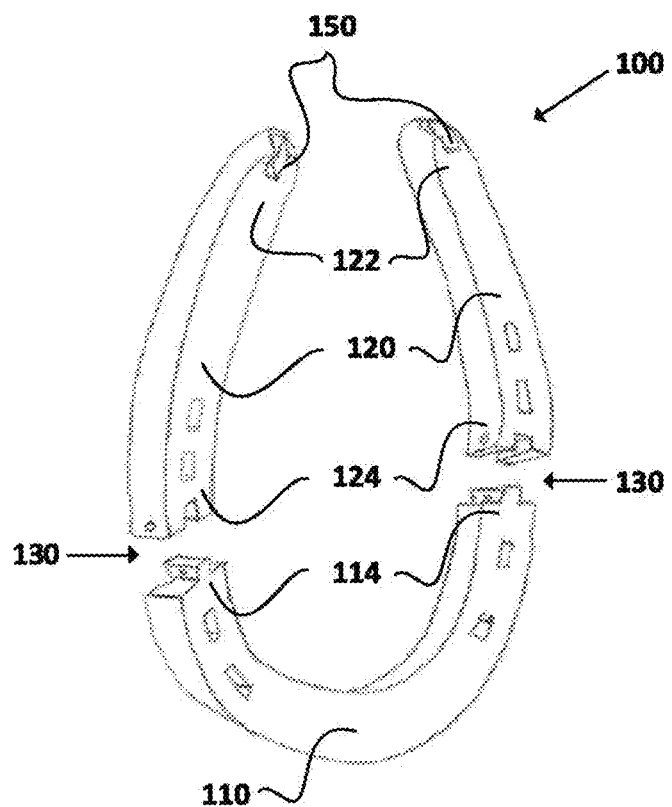
FIG. 5 illustrates an exploded view of the D.I.A.S. for horses of FIG. 4.

FIG. 4 illustrates an example D.I.A.S. 100 shod on a subject horse hoof 10, while FIG. 5 illustrates an exploded view of the D.I.A.S. 100 of FIG. 4. Toe portion 110 includes toe joint ends 114 whereas each heel portion 120 includes a heel joint end 124 and point end 122. Each heel joint end 124 is fastened to a toe joint end 114, forming the interlocking joint 130 of the D.I.A.S. 100, as will be described in more detail below. Nail-holes 140 allow nails to fasten (e.g., shod) the D.I.A.S. 100 to the wall 22 of the hoof 10. The toe portion 110 may have, for example, four nail-holes 140 with two adjacent each toe joint end 114 while each heel portion 120 may have, for example, two nail-holes 140 adjacent each heel joint end 124. More or less nail-holes 140, for example, may be included and placed at various locations of the D.I.A.S. 100. Optionally, for example, the D.I.A.S. 100 may be fastened to the hoof by other methods not using nails or nail-holes, such as with adhesives. Each heel portion 120 may include an optional bar attachment joint 150 at the point end 122. The bar attachment joint 150 may be a protrusion or a recess able to attach to a matching recess or protrusion, respectively, located at the ends of an optional accessory. For example, as seen in FIG. 5, a rectangular recess may receive a matching rectangular protrusion, which will be described in more detail below. Other protrusion and recess shapes may be employed such as, for example, semicircular, triangular, dovetail, or the like.

Figure 6:
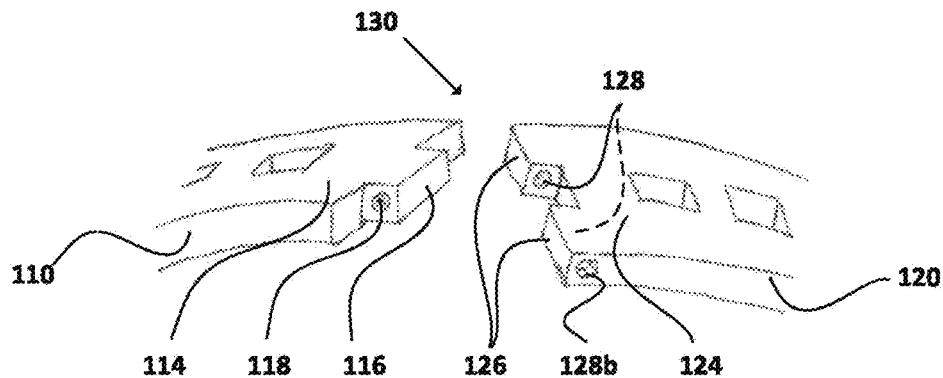
FIG. 6 illustrates an expanded view of an interlocking joint.
Figure 7:
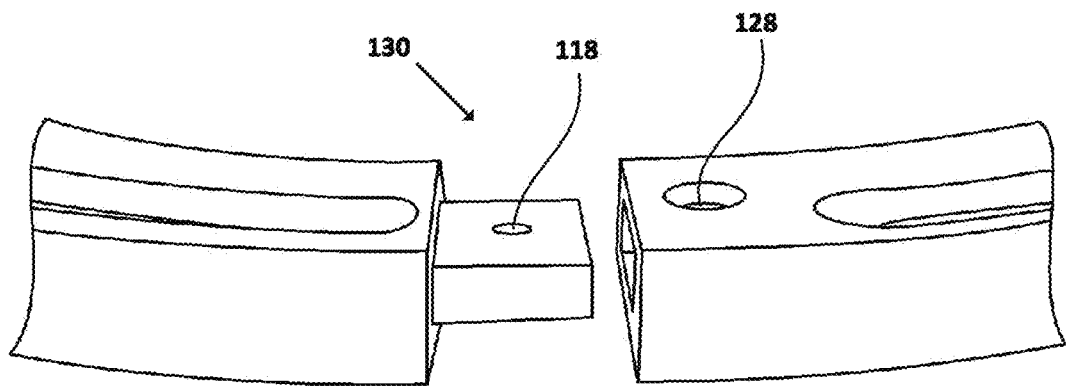
FIG. 7 illustrates an expanded view of an alternate interlocking joint.
Figure 8:
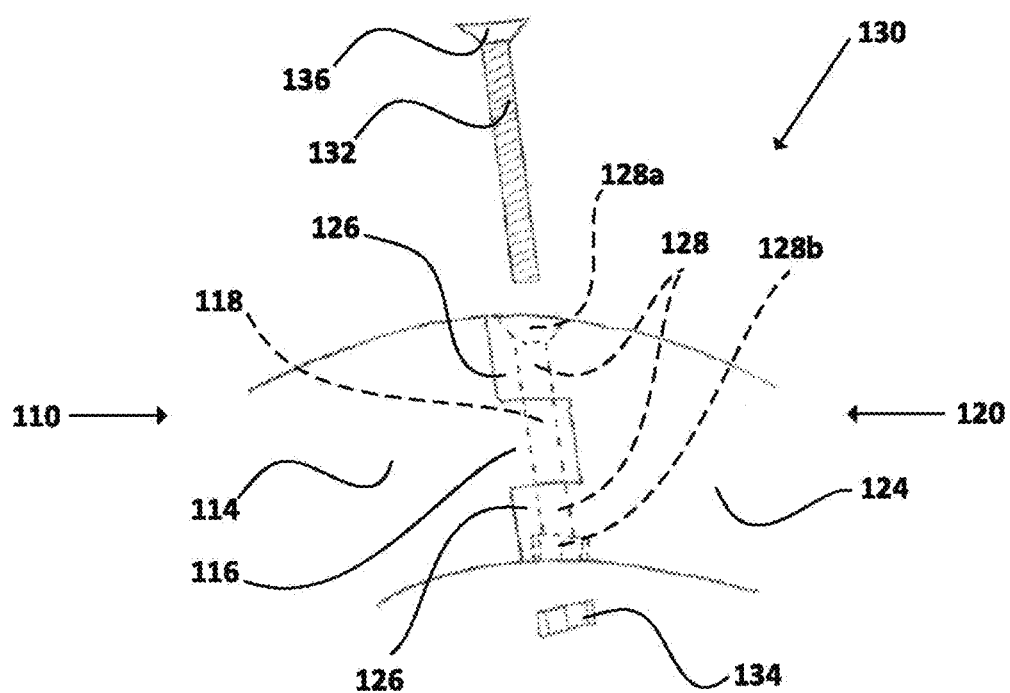
FIG. 8 illustrates a bottom view of the interlocking joint of FIG. 6.

FIG. 6 illustrates an expanded view of an interlocking joint 130, while FIG. 8 illustrates a bottom view of the interlocking joint 130 of FIG. 6. The interlocking joint 130 may include mating protrusions 116, 126. For example, the toe joint end 114 of a toe portion 110 may include one or more toe protrusions 116 while the heel joint end 124 of a heel portion 120 may include one or more heel protrusions 126. Each protrusion 116, 126, may include an aperture 118, 128. When a toe protrusion 116 is mated to a heel protrusion 126, forming an interlocking joint 130, the toe aperture 118 is aligned to the heel aperture 128. The apertures 118, 128 may be drilled through or tapped with threads. A fastener 132 may pass through the aligned apertures 118, 128. The apertures 118, 128, for example, may be completely threaded, partially threaded, or unthreaded wherein the fastener 132 may thread into all apertures 118, 128, into one or more apertures 118, 128, or no apertures 118, 128. The fastener 132 may also be connected to a connector 134 fixing the interlocking joint 130. For example, the fastener 132 may be a bolt or screw with threads and the connector 134 may be a nut with mating threads. Likewise the fastener 132 may be a pin and the connector 134 may be a releasable clip, such as a cotter pin. Outer apertures 118, 128 may include, for example, a conical countersunk recess 128a able to accept the end of a fastener 132 having a flat head 136 and a hexagonal countersunk recess 128b able to accept a nut connector 134. The hexagonal countersunk recess 128b may hold the connector 134 (e.g., but) and allow the walls of the recess 128b to prevent the connector from turning during the fixing of the fastener 132 to the connector 134. Likewise countersunk recesses 128a, 128b would prevent accidental damage to the fastener 132 of the interlocking joint 130 that would be possible in an exposed fastener 132 and connector 134. It is noted that other types of interlocking joints 130 may also be used, such as that shown in FIG. 7, while maintaining the spirit of the present disclosure.

Figure 9:
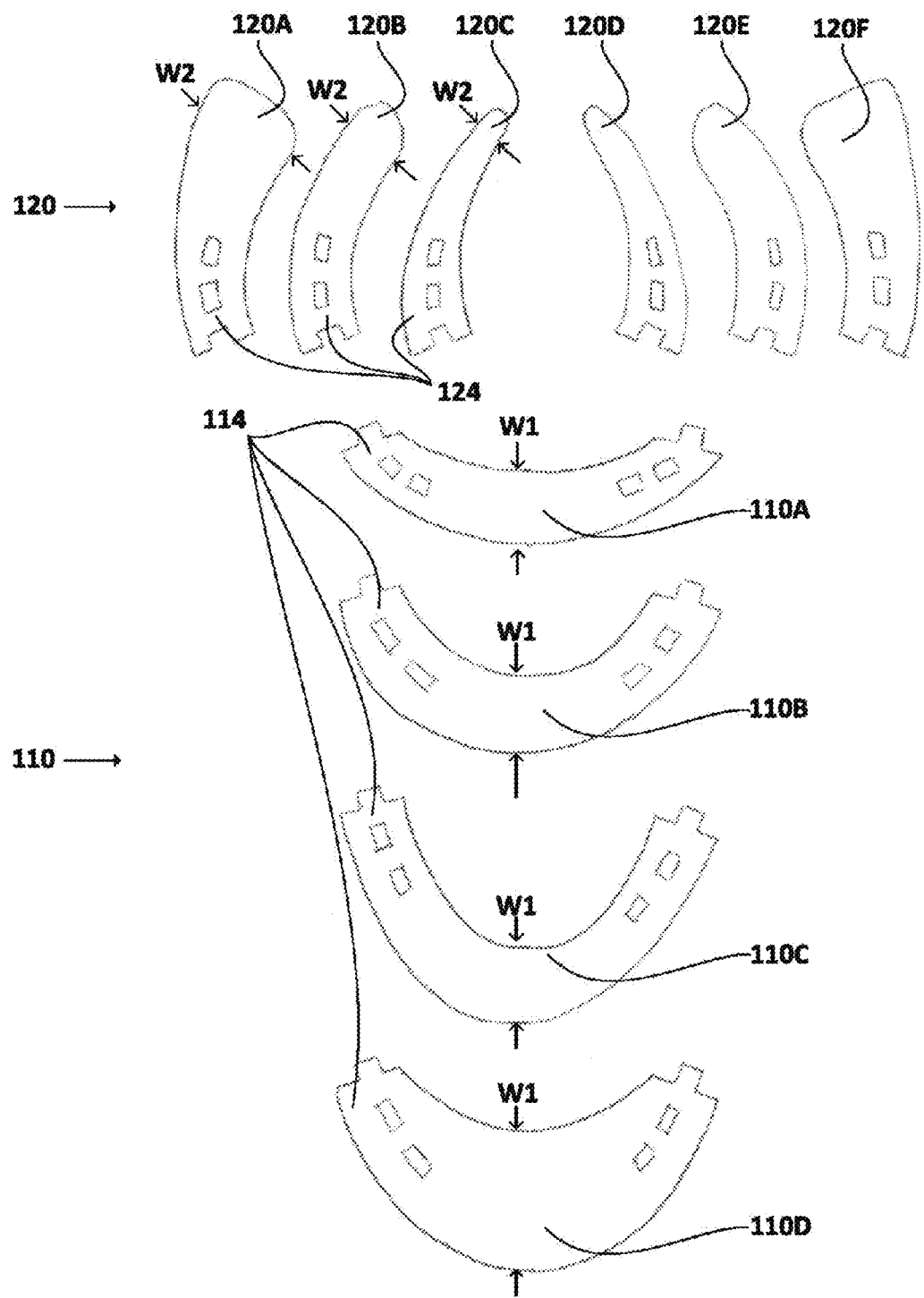
FIG. 9 illustrates bottom views of various embodiments of the D.I.A.S. for horses.

FIG. 9 illustrates bottom views of various embodiments of toe and heel portions 110, 120 for the D.I.A.S. 100. Hooves 10 have many sizes as described above. A veterinarian, equine podiatrist, or farrier may not know the dimensions of each and every hoof 10 before arriving at the horse stable. Having a variety of toe and heel portions 110, 120 allows the farrier to select the proper D.I.A.S. 100 for each hoof. For example, a subject horse may have front hooves 10 that differ from the rear hooves 10, each requiring a different D.I.A.S. 100.

Toe portions 110, for example, may be a short toe portion 110A, a medium toe portion 110B, a long toe portion 110C, or a wide toe portion 110D. Other toe portion shapes are contemplated. Medial heel portions (120A, 120B, 120C) and lateral heel portions (120D, 120E, 120F) are similar in size but reverse in orientation so as to protect the medial and lateral quarters 14 and heels 16 of a hoof 10. The inner edge of the medium toe portion 110B and wide toe portion 110D are similar in size. The outer edge of the long toe portion 110C and wide toe portion 110D are similar in size. Measured at the center of the toe portion 110, the short toe portion 110A, medium toe portion 110B, and long toe portion 110C have a toe width W1 of approximately 1 inch whereas the toe width W1 of a wide toe portion 110D is approximately 2 inches. The wide toe portion 110D may taper from the toe joint ends 114, 114 to center of the toe portion 110 for eased unrollment/breakover.

Heel portions 120, for example, may be a wide heel portion 120A, 120F, a medium heel portion 120B, 120E, or a narrow heel portion 120C, 120D. Other heel portion shapes are contemplated. Measured at approximately the point end 122 of the heel portion 120, the wide heel portions 120A, 120F have a heel width W2 of approximately 2 inches, the medium heel portions 120B, 120E have a heel width W2 of approximately 1 inch, and the narrow heel portions 120C, 120D have a heel width W2 of approximately 0.5 of an inch. The wide heel portions 120A, 120F may protect the lateral and medial quarters 14 of a hoof 10 having collateral quarters and may be formed of a heel width W2 tapering to the joint width W3. The narrow heel portions 120C, 120D may protect the lateral and medial quarters 14 of a hoof 10 having suspensory/thin branch quarters and may be formed of a heel width W2 expanding to the joint width W3.

The toe joint ends 114 and heel joint ends 124 of all toe portions 110 and heel portions 120 have a common joint width W3 so as to be interchangeable regardless of toe width W1 and heel width W2 dimensions. For example, FIG. 1 illustrates a D.I.A.S. 100 with a medium toe portion 110B and medium heel portions 120B, 120E all having a common joint width W3 at the interlocking joints 130, 130. Heel portions 120 need not be employed in matching pairs. For example, a subject horse requiring a medial narrow heel portion 120C and lateral wide heel portion 120F may be combined with a long toe portion 110C to form the D.I.A.S. 100. The selection of toe and heel portions 110, 120 may be based on each individual hoof 10.

Figure 10:
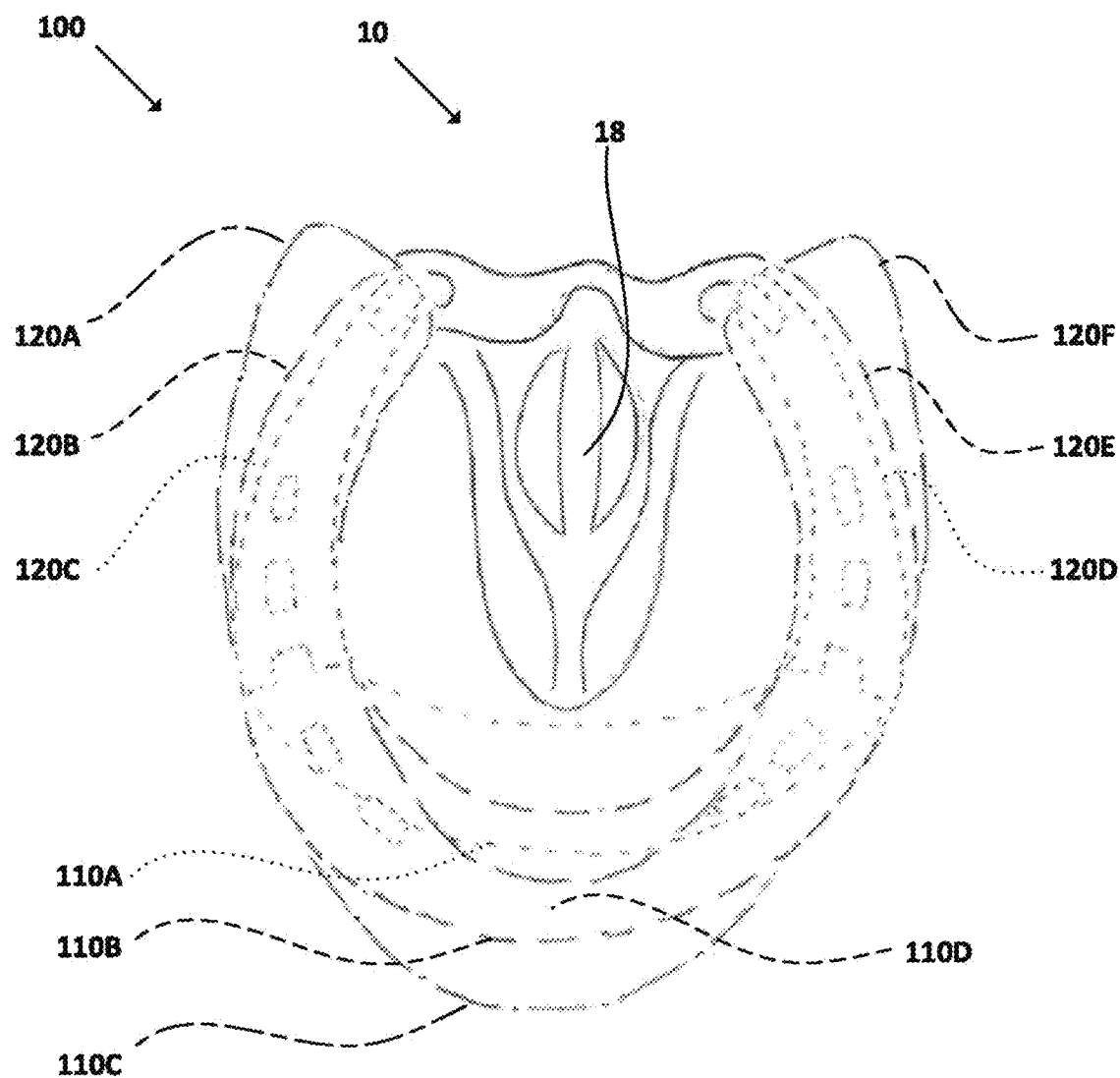
FIG. 10 illustrates a bottom view of various embodiments of the D.I.A.S. for horses placed against a hoof.

FIG. 10 illustrates a bottom view of various embodiments of the D.I.A.S. 100 placed against a common hoof 10. In comparison to a frog 18 of a common hoof 10, the inner edge of a short toe portion 110A is substantially adjacent to the tip of the frog 18, the inner edges of a medium toe portion 110B and a wide toe portion 110D are substantially 1 inch from the tip of the frog 18, and the inner edge of a long toe portion 110C is substantially 2 inches from the tip of the frog 18.

FIG. 11 illustrates a bottom view of an example heartbar portion 160 accessory for attachment to the optional bar attachment joint 150 of the D.I.A.S. 100. Regardless of which heel portions 120 are selected for the D.I.A.S. 100, the bar attachment joint 150 is located in the same place. The heartbar portion 160 includes a crossmember 162 and a frog cover 164. The crossmember 162 spans the opening formed by the point ends 122 of the heel portions 120 so as to form an enclosed D.I.A.S. 100 having a substantially circular shape. The crossmember 162 protects the heels 16, 16 of a hoof 10. The frog cover 164 extends from the crossmember 162 into the center of the D.I.A.S. 100 so as to protect the frog 18 of a hoof 10. The heartbar portion 160 may include attachment ends 166, which may be protrusions or recesses able to attach to a matching recess or protrusion, respectively, located at the bar attachment joint 150. A similar connection as that of the interlocking joint 130 shown in FIGS. 6 and 8 may be used at the bar attachment joint 150. The heartbar portion 160 may be prescribed for heel soreness, navicular, and incorporates the frog as a weightbearing structure. The heartbar portion 160 can also be used for "flat feet", horses with minimal vertical depth of the distal phalanx, as well as certain cases of laminitis.

FIG. 12 illustrates a bottom view of an example eggbar portion 170 accessory also for attachment to the optional bar attachment joint 150 of the D.I.A.S. 100. The eggbar portion 170 includes a crossmember 172 having attachment ends 176. The crossmember 162 spans the opening formed by the point ends 122 of the heel portions 120 so as to form an enclosed D.I.A.S. 100 having a substantially circular shape. The crossmember 162 protects the heels 16, 16 of a hoof 10. The attachment ends 166 may be protrusions or recesses able to attach to a matching recess or protrusion, respectively, located at the bar attachment joint 150. A similar connection as that of the interlocking joint 130 shown in FIGS. 6 and 8 may be used at the bar attachment joint 150. The eggbar portion 170 may be prescribed for "navicular" horses. The eggbar portion 170 slows the sinking of a hoof 10 throughout the loading phase of the stride and eases stress on the Deep Digital Flexor Tendon (DDFT) and navicular. The eggbar portion 170 can be attached to D.I.A.S. 100 and the subject horse can be evaluated to assess whether its application alleviates stress, strain, and/or unsoundness. Additionally, in laminitis cases where a reverse shoe is desired to alleviate stress on the toe 12, the eggbar portion 170 may be applied and the toe portion 110 may be removed to assess if the reverse D.I.A.S. 100 achieves comfort in the subject horse by elevating the heel 16 and alleviating strain on the toe 12.

FIG. 13 illustrates a side view of a D.I.A.S. 100 having a heel wedge 180. The heel wedge 180 may be made from rigid materials such as metals (i.e., steel or aluminum), pliable material such as plastics (i.e., durable composite materials), or from resilient materials such as reinforced rubber material, for example. Heel wedges 180 may have varying widths to match the narrow, medium, and wide heel portion 120A-120F. The heel wedges 180 may also have varying degrees of incline. For example, FIG. 14 illustrates side views of various embodiments of the heel wedges 180 wherein heel wedges 181 have one degree of incline, heel wedges 182 have two degrees of incline, heel wedges 183 have three degrees of incline, and heel wedges 184 have four degrees of incline. Heel wedges 180 having other incremental degrees of incline or those of greater degrees of incline than four degrees are also contemplated. Likewise, the heel wedges 180 may have a short version (181S-184S) having a length of approximately 1.5 inches and a long version (181L-184L) having a length of approximately 2.0 inches. According to various embodiments, wedges, such as 188, may include one piece that has an increasing degree of incline which starts at the attachment section through to the end of the heel. When the section is attached to the toe section and affixed to the hoof, it may positively increase the hoof caudally, the palmar angle of P3 (the "coffin bone"), as well as the measured hoof angle.

The heel wedge 180 may be fixed to the heel portion 120 of the D.I.A.S. 100 with adhesives and/or fasteners, such as a screw or bolt passing through the center of the heel wedge 180 into heel portion 120. FIG. 15 illustrates a bottom view of the D.I.A.S. 100 illustrating a fastener 186 fixing the heel wedges 180 to the bottom surface 104 of the heel portions 120.

When horseshoes are required to enable a subject horse to perform its job comfortably and soundly, the question is often posed, where should the shoe be placed in proximity to the frog to allow for the subject horse's peak performance? The user of the D.I.A.S. 100 will be able to examine the subject horse using the various toe portions 110 and adjust them enabling the user's ability to determine optimal horseshoe placement.

When certain soft tissue injuries occur in horses, temporary relief is sought and there is a desired slowing of the sinking of the hoof 10 through the medial or lateral quarter to alleviate potential strain on the soft tissue. The wide heel portions 120A, 120F may be applied as directed by the attending veterinarian, injury dependent either medially or laterally in order to assess whether its application alleviates stress or strain.

The narrow heel wedges 120C, 120D may be used medially and laterally or individually to allow for greater sink of the quarter 14 through heel 16 of the hoof 10, alleviating strain on the suspensory branches, body and origin. Additionally, the wide heel portion 120A, 120F may be incorporated to slow the toe 12 sink of the hoof 10 in suspensory related injuries or for alleviation of sole 20 pressure or protection of the sole 20 because of its wider web.

The heel wedges 180 may be applied in varying degrees to increase the Palmar Angle of the distal phalanx, encouraging phalangeal alignment, alleviating stress/strain on the DDFT and Navicular. The heel wedges 180 may be in pairs and may start with 1-degree heel wedges 181 up to 4-degree heel wedges 184 or more. Again, the user can apply the varying degreed heel wedges 180 and assess the subject horse's comfort after application. Likewise, shorter heel wedges (181S-184S) or longer heel wedges (181L-184L) may be applied to assess the subject horse's comfort after application.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A diagnostic horseshoe kit for assembling a modular horseshoe configured for optimal horseshoe placement, said kit comprising:
 a plurality of arcuate toe portions, each toe portion having a width-wise dimension, a length-wise dimension and a toe joint at each end of the length-wise dimension, wherein the plurality of toe portions comprises toe portions with different width-wise dimensions at the center of the arc and toe portions with different length-wise dimensions between the toe joints at each end;
 a plurality of lateral heel portions, each lateral heel portion comprising a point end and a heel joint end configured to mate with a corresponding toe joint, wherein the lateral heel potions vary in thickness or vary by the width of the point end; and
 a plurality of medial heel portions, each medial heel portion comprising a point end and a heel joint end configured to mate with a corresponding toe joint, wherein the medial heel potions vary in thickness or vary by the width of the point end;
 wherein the heel joint ends of the lateral heel portions interlock with one of the two toe joint ends of the toe portions to maintain an alignment between the heel joint end of the lateral heel portions and the one of the two toe joint ends of the toe portions, and
 wherein the heel joint ends of the medial heel portions interlock with the other the two toe joint ends of the toe portions to maintains an alignment between the heel joint end of the lateral heel portions and the other of the two toe joint ends of the toe portions.

2. The horseshoe kit of claim 1, wherein the toe portion dimensions, and the lateral and medial heel portion dimensions, are configured to provide for optimal placement of the modular shoe relative to the frog part of the hoof.

3. The horseshoe kit of claim 1, wherein the toe portion dimensions, and the lateral and medial heel portion dimensions, are configured to alleviate stress or strain on soft tissue.

4. The horseshoe kit of claim 1, further comprising fasteners configured to secure the lateral and medial heel portions to the toe portions.

5. The horseshoe kit of claim 4, wherein the fastener is a screw.

6. The horseshoe kit of claim 1, further comprising heel wedges varying by width, length, degree of incline and resilience, and configured to be fastened to lateral or medial heel portions.

7. The horseshoe kit of claim 6, comprising heel wedges configured to be fastened to lateral heel portions or medial heel portions with an adhesive.

8. The horseshoe kit of claim 6, comprising heel wedges configured to be screwed against the lateral heel portions or medial heel portions.

9. The horseshoe kit of claim 6, wherein the heel wedges comprise heel wedges with an incline angle of approximately 1 to 3 degrees.

10. The horseshoe kit of claim 1, further comprising a plurality of eggbars.

11. The horseshoe kit of claim 1, further comprising a plurality of heartbars.

12. The horseshoe kit of claim 1, further comprising a plurality of collateral quarters.

\* \* \* \* \*